United States Patent [19]
Yokota et al.

[11] Patent Number: 5,831,414
[45] Date of Patent: Nov. 3, 1998

[54] CHARGING APPARATUS WITH CONTACT END SLIDING IN ACCORDANCE WITH WEIGHT OF SECONDARY BATTERY

[75] Inventors: Hidetsugu Yokota; Shinichi Miyazaki, both of Saitama, Japan

[73] Assignee: NEC Corporation, Tokyo, Japan

[21] Appl. No.: 883,882

[22] Filed: Jun. 27, 1997

[30] Foreign Application Priority Data

Jul. 5, 1996 [JP] Japan .................................... 8-194117
May 23, 1997 [JP] Japan .................................... 9-148460

[51] Int. Cl.$^6$ .......................... H01M 10/44; H01M 10/46
[52] U.S. Cl. ............................................. 320/112; 320/115
[58] Field of Search .................................... 320/107, 110, 320/111, 112, 113, 115, 101, 105, 114; D13/103, 107; 429/96, 100

[56] References Cited

U.S. PATENT DOCUMENTS

| 4,578,628 | 3/1986 | Siwiak | 320/112 |
| 5,283,511 | 2/1994 | Keener et al. | |
| 5,473,242 | 12/1995 | McKenna | 320/113 |
| 5,506,488 | 4/1996 | Leisgrson | 320/112 |
| 5,686,810 | 11/1997 | Yasui | 320/113 |

FOREIGN PATENT DOCUMENTS

| 0 479 249 A2 | 4/1992 | European Pat. Off. . |
| 4-124756 | 11/1992 | Japan . |
| 2 297 861 | 8/1996 | United Kingdom . |
| WO 94/18738 | 8/1994 | WIPO . |

Primary Examiner—Edward Tso
Attorney, Agent, or Firm—Scully, Scott, Murphy & Presser

[57] ABSTRACT

In a charging apparatus, a constant current circuit has a plurality of output terminals for supplying charging current with a plurality of current values, respectively. A plurality of contact pads connected to the output terminals of the constant current circuit. A conductive elastic lead has one of ends which slides in response to installation of a secondary battery in the case to contact one of the plurality of contact pads. Thus, a portion of the conductive elastic lead is connected to the secondary battery to supply the charging current from the constant current circuit to the secondary battery via the contacting one of the plurality of contact pads.

13 Claims, 5 Drawing Sheets

CHARGING APPARATUS WITH CONTACT END SLIDING IN ACCORDANCE WITH WEIGHT OF SECONDARY BATTERY

BACKGROUND OF THE INVENTION

1. Field of the Invention

The present invention relates to a charging apparatus and a charging method, and more particularly to a charging method in which charging current is automatically switched in accordance with the charging capacity of a secondary battery, and a charging apparatus for the same.

2. Description of the Related Art

Various techniques are known with respect to a charging apparatus in which charging current is switched automatically in accordance with the charging capacity of a secondary battery. As a first example of the above conventional technique, there is known the charging apparatus in which the weight of a secondary battery (a secondary battery package) is detected. In the first conventional example, a charging operation is performed with a correct charging current which is determined in accordance with the charging capacity of the secondary battery. In this case, the magnitude of charging current is determined based on the difference in weight between the secondary batteries (the secondary battery packages). Such a conventional technique is disclosed in, for example, Japanese Laid Open Utility Model Application Disclosure (JP-U-Heisei 4-124756).

FIG. 1 is a block diagram to describing the above-mentioned first conventional example. In the figure, reference numeral 1a designates a charging apparatus, reference numeral 30 designates a variable current supply circuit, reference numeral 31 designates a weight detecting circuit, reference numeral 32 designates the detecting terminal, and reference numerals 33 and 34 designates charging terminals. Also, reference numeral 2 designates a secondary battery package. In this secondary battery package 2, the number of built-in battery cells 23 is different from each other as shown in FIGS. 5A to 5C. Note that there is a case in which the secondary battery package and the battery cells cannot be distinguished from each other, because the secondary battery package and the battery cells are unified as a body. For this reason, in this application, the battery cells including the secondary battery package are collectively referred to as the secondary batteries 2, hereinafter, including the secondary battery package.

In the secondary battery 2, the number of built-in battery cells 23 is different from each other, as shown in, for example, FIGS. 5A to 5C. Therefore, the charging capacities when the charging operation is to be performed are different from each other so that the charging currents are also different from each other. In addition, the weights of the secondary batteries are also different from each other.

In accordance with the first conventional example shown in FIG. 1, the weight detecting circuit 31 is provided to detect the difference in the sinking state of the detection terminal 32 depending upon the weight of the secondary battery 2. As a result, the weight difference of the secondary battery 2 can be detected. The constant current which is output from the variable current supply circuit 30 is adjusted so as to be adaptive for the secondary battery 2 based on the weight detection information from this weight detecting circuit 31. Then, the adjusted current is supplied to an input terminal 20 of the secondary battery package 2 from the charging terminal 33.

In the charging apparatus according to the above-mentioned first conventional example, the detection terminal and the weight detecting circuit for detecting the weight of the secondary battery and so on are necessary. Therefore, there is a problem in that the number of parts increases and the manufacturing steps also increase, so that the manufacturing cost becomes high.

SUMMARY OF THE INVENTION

The present invention is intended to solve the above-mentioned problem. An object of the present invention is to provide a charging method and charging apparatus in which the weight of a secondary battery (a battery package) can be detected and thereby the current value which is determined in accordance with the necessary charging capacity is automatically selected such that the charging operation is performed.

Accordingly, a first embodiment of the charging apparatus of the present invention is provided, wherein the charging apparatus comprises a case, a constant current circuit having a plurality of output terminals for supplying charging current with a plurality of current values, respectively, a plurality of contact pads connected to the output terminals of the constant current circuit, and a conductive elastic lead having one end which slides in response to installation of a secondary battery in the case to contact one of the plurality of contact pads, wherein a portion of the conductive elastic lead is connected to the secondary battery to supply the charging current from the constant current circuit to the secondary battery via the contacting one of the plurality of contact pads.

In this case, the conductive elastic lead is deformed in accordance with the weight of the secondary battery such that the one end slides to the one of the plurality of contact pads, when the secondary battery is installed in the case. That is, the conductive elastic lead has a structure in which the conductive elastic lead is bent at a middle portion to have a convex portion, and the secondary battery is weighted on the convex portion. When the secondary battery having an input terminal for the charging current is at a lower surface, the convex portion is connected to the input terminal of the secondary battery.

Also, the plurality of contact pads are provided on an upper surface of a concave section of the case, and the conductive elastic lead is provided on the upper surface of the concave section of the case such that the one end slides to the one of the plurality of contact pads.

A second embodiment of the charging apparatus of the present invention is also provided, wherein the charging apparatus comprises a case, a constant current supplying section for supplying, via a plurality of contact pads, charging current with a plurality of current values, respectively, and a first conductive elastic lead having one of ends slided in accordance with weight of a secondary battery to contact one of the plurality of contact pads, when the secondary battery is installed in the case, wherein a portion of the first conductive elastic lead is connected to the secondary battery to supply the charging current from the constant current supplying section to the secondary battery. In this case, the charging apparatus may further includes a second conductive elastic lead connected to a ground input terminal of the secondary battery and the constant current supplying section.

Also provided herein is a method for charging a secondary battery in a charging apparatus. The method comprises the steps of:

installing a first secondary battery having a first weight in a case;

sliding one end of a first conductive lead in response to the installation of the first secondary battery;

contacting the sliding end with one of a plurality of contact pads; and supplying a charging current with a first predetermined current value to the first secondary battery via the one contact pad.

When the first secondary battery from the case is removed, the one end is slid back to an original position in response to the removal of the first secondary battery. When a second secondary battery having a second weight is installed in the case, the one end of the first conductive lead is slid in response to the installation of the second secondary battery to contact another of the plurality of contact pads such that the charging current with a second predetermined current value is supplied to the second secondary battery via the other contact pad.

DESCRIPTION OF THE PREFERRED EMBODIMENTS

Hereinafter, a charging apparatus of the present invention will be described below in detail with reference to the drawings.

Figure 3:
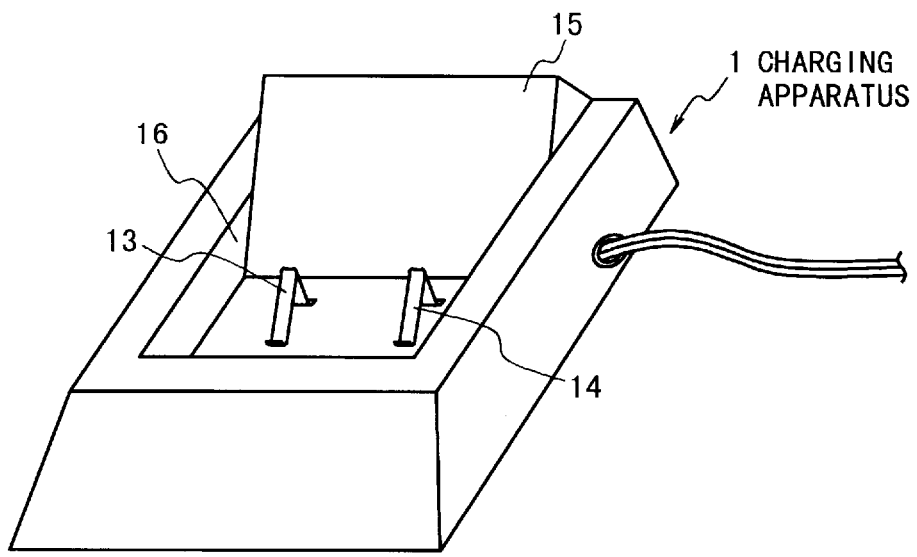
FIG. 3 is a perspective view illustrating the outer appearance structure of the charging apparatus according to the first embodiment of the present invention.
Figure 4:
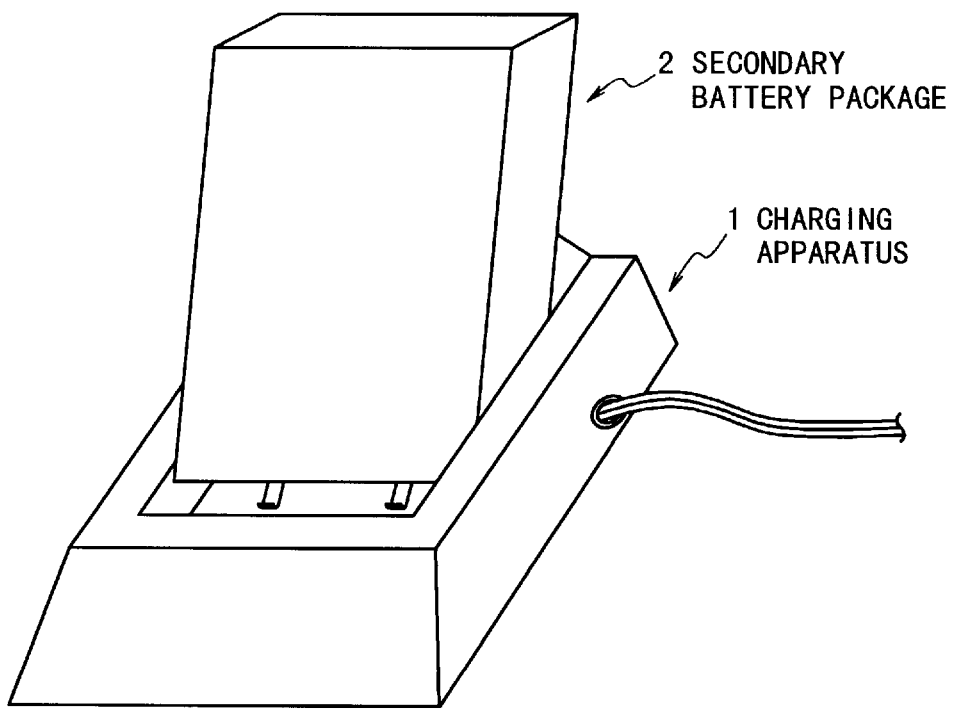
FIG. 4 is a perspective view illustrating the state in which a secondary battery is installed in the charging apparatus according to the first embodiment of the present invention.

FIG. 3 is a perspective view illustrating the outer appearance structure of the charging apparatus 1 according to the first embodiment of the present invention. FIG. 4 is a perspective view illustrating the state in which the secondary battery 2 is installed in charging apparatus 1.

Figure 5A:
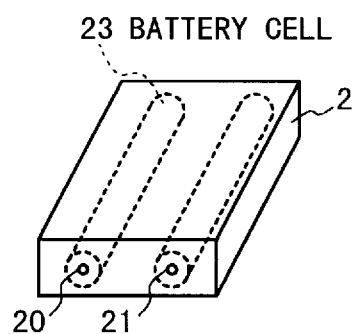
FIGS. 5A to 5C are diagrams illustrating various secondary batteries (secondary battery packages)
Figure 5B:
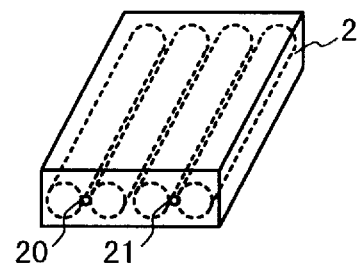
Figure 5C:
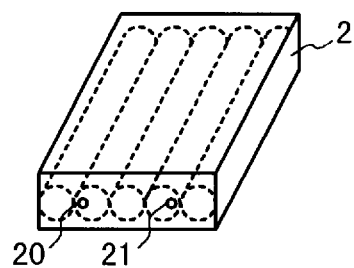

Referring to FIG. 3, the charging apparatus 1 has a concave section 16. The concave section 16 is provided with charging terminals 13 and 14. The charging terminals 13 and 14 have the same structure and are the charging terminals of the positive and negative sides, respectively. The charging apparatus 1 has a triangular protrusion section 15 connected to the concave section 16. The protrusion section 15 has an inclined surface to receive a secondary battery 2, as shown in FIG. 4. The secondary battery 2 has two input terminals 20 and 21 which are to be connected to the charging terminal 13 and the ground terminal 14, respectively, as shown in FIGS. 5A to 5C.

Figure 1:
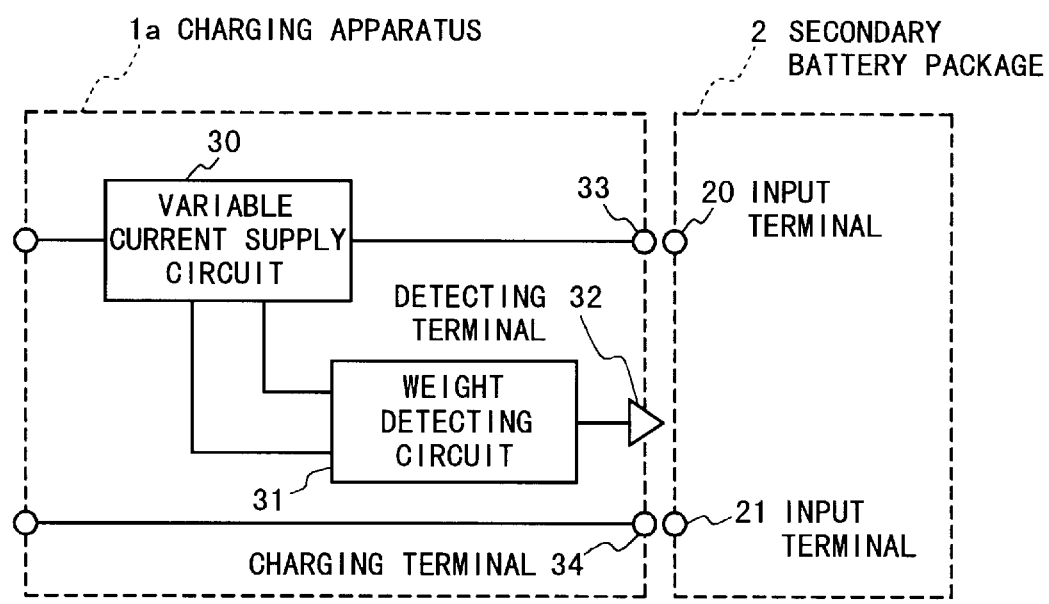
FIG. 1 is a diagram illustrating a conventional charging apparatus.
Figure 2A:
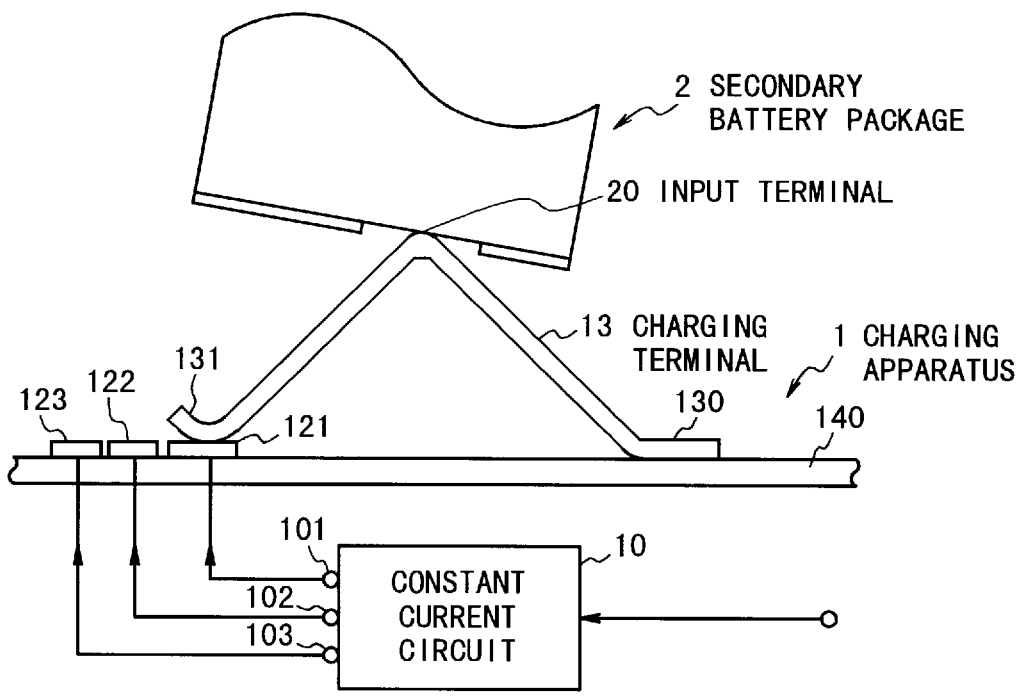
FIGS. 2A and 2B are partial cross sectional views illustrating a charging apparatus according to the first embodiment of the present invention.
Figure 2B:
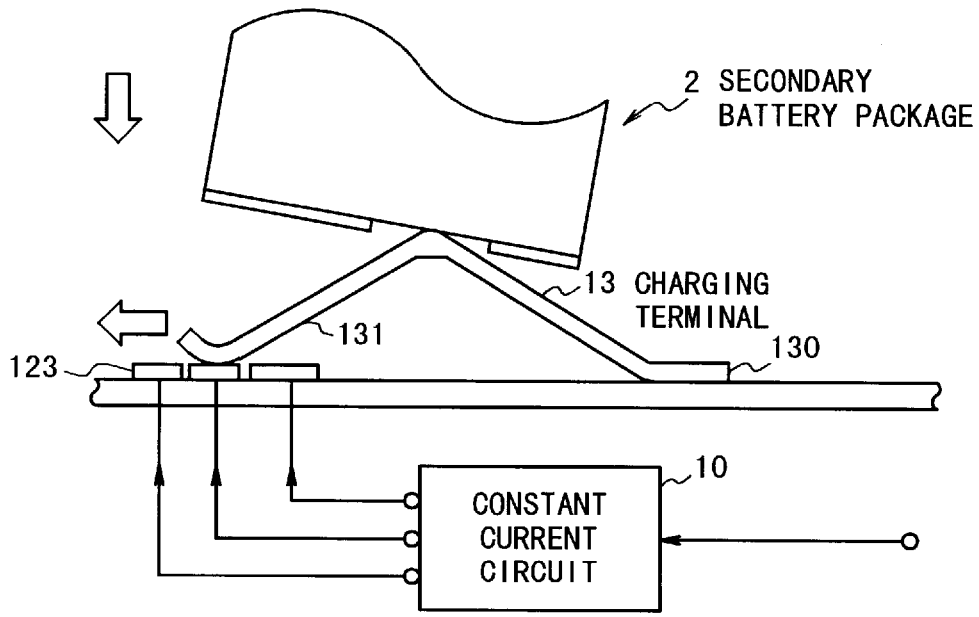

FIGS. 2A and 2B are partial cross sectional views to describe the operation principle of the charging apparatus of the present invention. In the figure, reference numeral 10 designates a constant current circuit built in the charging apparatus 1. Note that the circuits for dropping a power supply voltage to a predetermined voltage and for converting it into a direct current voltage are generally necessary for the charging apparatus in addition to the circuits which are shown in the figures. However, because the circuits are not directly related to the present invention, their description herein is omitted.

This constant current circuit 10 has a plurality of output terminals 101 to 103 and is structured in such a manner that charging currents having different current values are output from the terminals, respectively. The plurality of output terminals 101 to 103 of the constant current circuit 10 are connected to a plurality of contact pads 121 to 123, respectively. The plurality of contact pads 121 to 123 are provided on the upper bottom surface of the concave section 16.

A charging terminal 13 is also provided on the upper bottom surface of the concave section 16 of the charging apparatus 1. This charging terminal 13 is formed of a conductive elastic substance in a stripe manner. The elastic substance stripe is bent at a middle point so as to have a convex shape. End 130 of charging terminal 13 is a fixed end with the other end 131 being a sliding end. When the secondary battery 2 is installed in the charging apparatus 1, the top bent section of the charging terminal 13 first contacts the input terminals of the secondary battery 2. Then, the top bent section is pushed because of the weight of the secondary battery 2 so that the sliding end 131 slides to the left-hand direction in the figure. At this time, the slide quantity depends on the weight of the secondary battery 2.

On the other hand, in the direction which this sliding end 131 slides, the contact pads 121 to 123 which are respectively connected to the output terminals 101 to 103 of the constant current circuit 10 are provided. As a result, the sliding end 131 contacts one of these contact pads 121 to 123 in accordance with the slide quantity of the sliding end 131.

In this case, when the secondary battery containing two battery cells 23, as shown in FIG. 5A, is installed on the charging apparatus 1 having the structure as described above, the sliding end 131 of the charging terminal 13 contacts the contact 121, as shown in FIG. 2A. As a result, a constant current from the output terminal 101 of the constant current circuit 10 is supplied to the input terminal 20 of the secondary battery 2. In this manner, the charging operation is performed. The charging current in this case has the current value which is output from output terminal 101 of the constant current circuit 10.

Also, when the secondary battery 2 containing five battery cells 23, as shown in FIG. 5C, is installed inn the charging apparatus 1, the sliding end 131 of the charging terminal 13 slides to contact the contact pad 123. Therefore, the secondary battery 2 is charged with the constant charging current having the current value which is output from the output terminal 103 of the constant voltage circuit 10.

That is, the charging apparatus of the present invention includes the charging terminal 13 whose sliding end 131 slides in accordance with the weight of the installed secondary battery 2. One of the contact pads 121 to 123 which contacts the sliding end 131 is determined in accordance with the slide quantity of this sliding end 131. Contact pads 121 to 123 are supplied with the charging currents housing different current values via output terminals 101 to 103 from the constant current circuit 10. Therefore, it is not necessary to particularly provide the detection terminal 32 and the weight detecting circuit 31, as shown in the above-mentioned conventional example.

As described above, the charging apparatus 1 of the present invention is designed in such a manner that the weight of the secondary battery 2 can be detected using the charging terminal 13 without providing any special means for detecting the weight of the installed secondary battery. Also, the charging apparatus 1 can output the correct current value. Therefore, the present invention reduces the number of parts which comprise the charging apparatus as well as the number of manufacturing steps. As a result, it becomes possible to reduce product.

Next, the charging apparatus according to the second embodiment of the present invention will be described.

Figure 6:
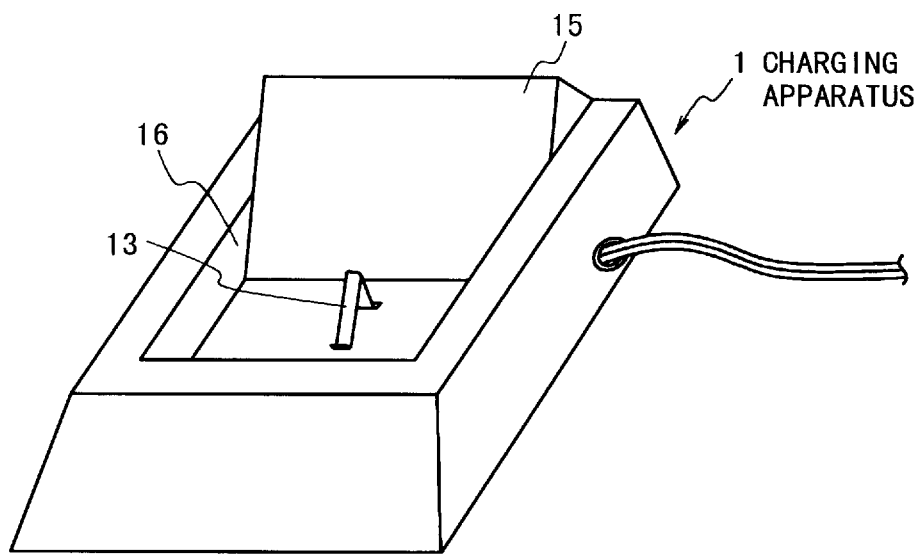
FIG. 6 is a perspective view illustrating the outer appearance structure of the charging apparatus according to the second embodiment of the present invention.

FIG. 6 is a perspective view illustrating the outer appearance structure of the charging apparatus 1 according to the second embodiment of the present invention. Referring to FIG. 6, the charging apparatus 1 has a concave section 16, as in the first embodiment. The concave section 16 is provided with only an elastic charging terminal 13, which is connected to an input terminal 20 of the secondary battery 2. An input terminal 21 of the secondary battery 2 is provided in another position thereof. For example, the input terminal 21 is provided on the side surface of the secondary battery 2. The input terminal 21 is connected to the negative terminal of the constant current circuit 10. The charging terminal 13 functions as described above.

What is claimed is:

1. A charging apparatus comprising:

a case;

a constant current circuit having a plurality of output terminals for supplying charging current with a plurality of different current values, respectively;

a plurality of contact pads respectively connected to said output terminals of said constant current circuit; and a conductive elastic lead having one of ends which slides in response to installation of a secondary battery in said case to contact one of the plurality of contact pads, wherein a portion of said conductive elastic lead is connected to said secondary battery to supply the charging current from said constant current circuit to said secondary battery via the contacting one of the plurality of contact pads.

2. A charging apparatus according to claim 1, wherein said conductive elastic lead is deformed in accordance with weight of said secondary battery such that said one end slides to said contacting one of the plurality of contact pads, when said secondary battery is installed in said case.

3. A charging apparatus according to claim 2, wherein said conductive elastic lead has a structure in which said conductive elastic lead is bend at a middle portion to have a convex portion, and wherein said secondary battery is weighted on said convex portion.

4. A charging apparatus according to claim 3, wherein said secondary battery having an input terminal for the charging current at a lower surface, and wherein said convex portion is connected to said input terminal of said secondary battery.

5. A charging apparatus according to claim 1, wherein said plurality of contact pads are provided on an upper surface of a concave section of said case, and wherein said conductive elastic lead is provided on the upper surface of the concave section of said case such that said one end slides to said contacting one of the plurality of contact pads.

6. A charging apparatus comprising:

a case;

constant current supplying means for supplying, via a plurality of contact pads, charging current with a plurality of different current values, respectively; and a first conductive elastic lead having one of ends slided in accordance with weight of a secondary battery to contact one of the plurality of contact pads, when said secondary battery is installed in said case, wherein a portion of said first conductive elastic lead is connected to said secondary battery to supply the charging current from said constant current supplying means to said secondary battery.

7. A charging apparatus according to claim 6, wherein said first conductive elastic lead has a structure in which said first conductive elastic lead is bend at a middle portion to have a convex portion, and wherein said secondary battery is weighted on said convex portion.

8. A charging apparatus according to claim 7, wherein said secondary battery having an input terminal for the charging current at a lower surface, and wherein said convex portion is connected to said input terminal of said secondary battery.

9. A charging apparatus according to claim 6, wherein said plurality of contact pads are provided on an upper surface of a concave section of said case, and wherein said first conductive elastic lead is provided on the upper surface of the concave section of said case such that said one end slides to said one of the plurality of contact pads.

10. A charging apparatus according to claim 6, further comprising a second conductive elastic lead connected to a ground input terminal of said secondary battery and said constant current supplying means.

11. A method for charging a secondary battery in a charging apparatus, comprising the steps of:

installing a first secondary battery having a first weight in a case;

sliding one of ends of a first conductive lead in response to the installation of the first secondary battery;

contact the sliding one end with one of a plurality of contact pads; and supplying a charging current with a first predetermined current value to said first secondary battery via said one contact pad.

12. A method according to claim 11, further comprising the steps of:

removing said first secondary battery from said case; and sliding back said one end to an original position in response to the removal of said first secondary battery.

13. A method according to claim 11, further comprising the steps of:

installing a second secondary battery having a second weight in said case;

sliding the one end of said first conductive lead in response to the installation of the second secondary battery;

contact the sliding one end with another of the plurality of contact pads; and supplying the charging current with a second predetermined current value to said second secondary battery via said other contact pad.

* * * * *